(12) United States Patent
Valencia, Jr.

(10) Patent No.: US 8,485,872 B2
(45) Date of Patent: Jul. 16, 2013

(54) ASYMMETRICAL PRESSURE RELIEF VENT

(75) Inventor: Pablo Valencia, Jr., Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1758 days.

(21) Appl. No.: 11/675,850

(22) Filed: Feb. 16, 2007

(65) Prior Publication Data

US 2008/0200109 A1    Aug. 21, 2008

(51) Int. Cl.
*B60H 1/24* (2006.01)
*F16K 15/00* (2006.01)
*F01L 7/06* (2006.01)

(52) U.S. Cl.
USPC .......................... 454/162; 137/512.15; 123/73

(58) Field of Classification Search
USPC .......................... 454/162; 137/512.15; 123/73
See application file for complete search history.

(56) References Cited

U.S. PATENT DOCUMENTS 5,105,849 A * 4/1992 Clough .................... 137/512.15
6,609,535 B2 * 8/2003 Oppermann et al. ..... 137/512.15

FOREIGN PATENT DOCUMENTS

DE    10011884 A1    12/2000

* cited by examiner

*Primary Examiner* — Steven B McAllister
*Assistant Examiner* — Helena Kosanovic

(57) ABSTRACT

One or more valves may be employed in a pressure relief vent of a vehicle. The valves may have asymmetrical closing characteristics of differing pressuring inducing closing characteristics or both in order to reduce the peak noise generated as the valves are closing.

8 Claims, 3 Drawing Sheets

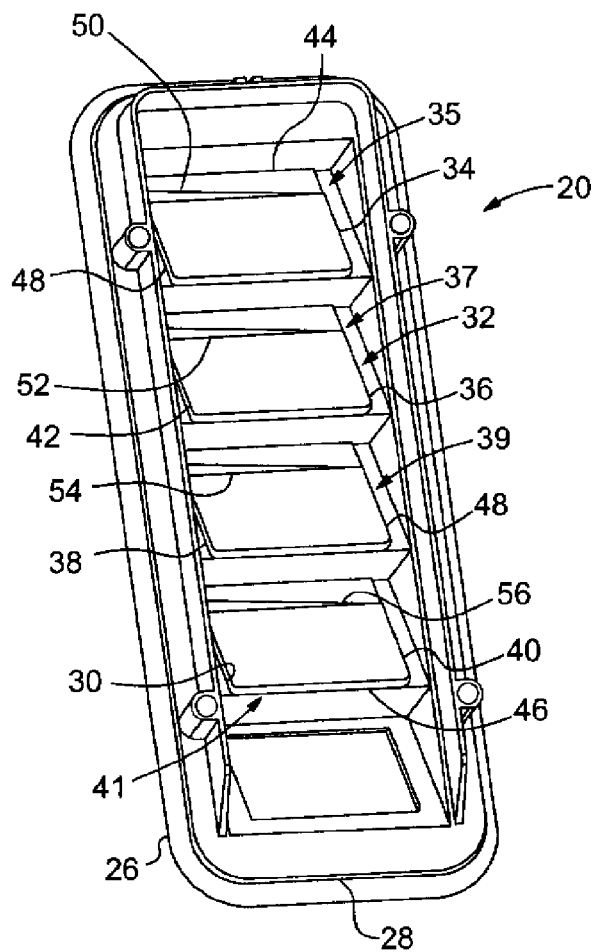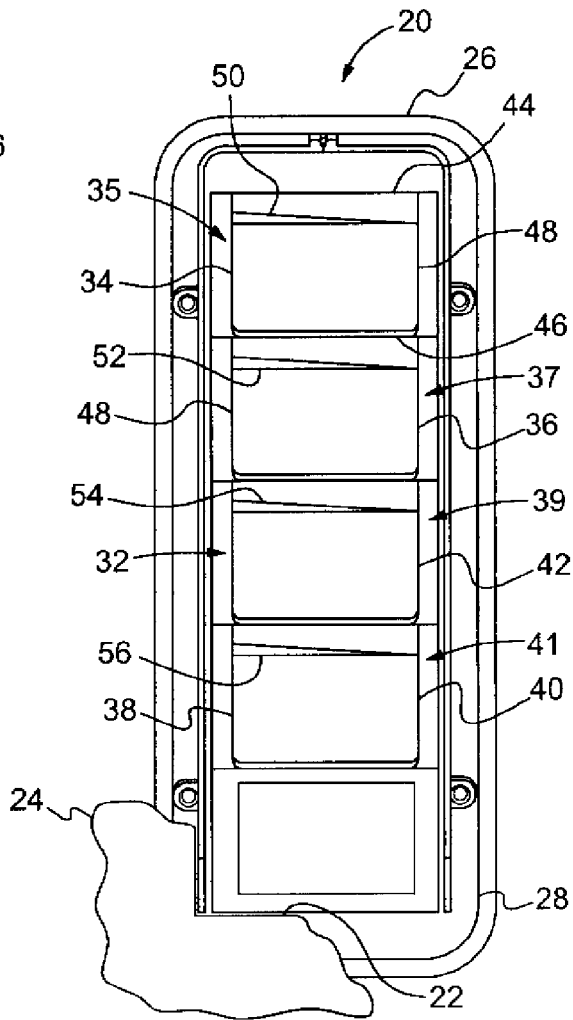

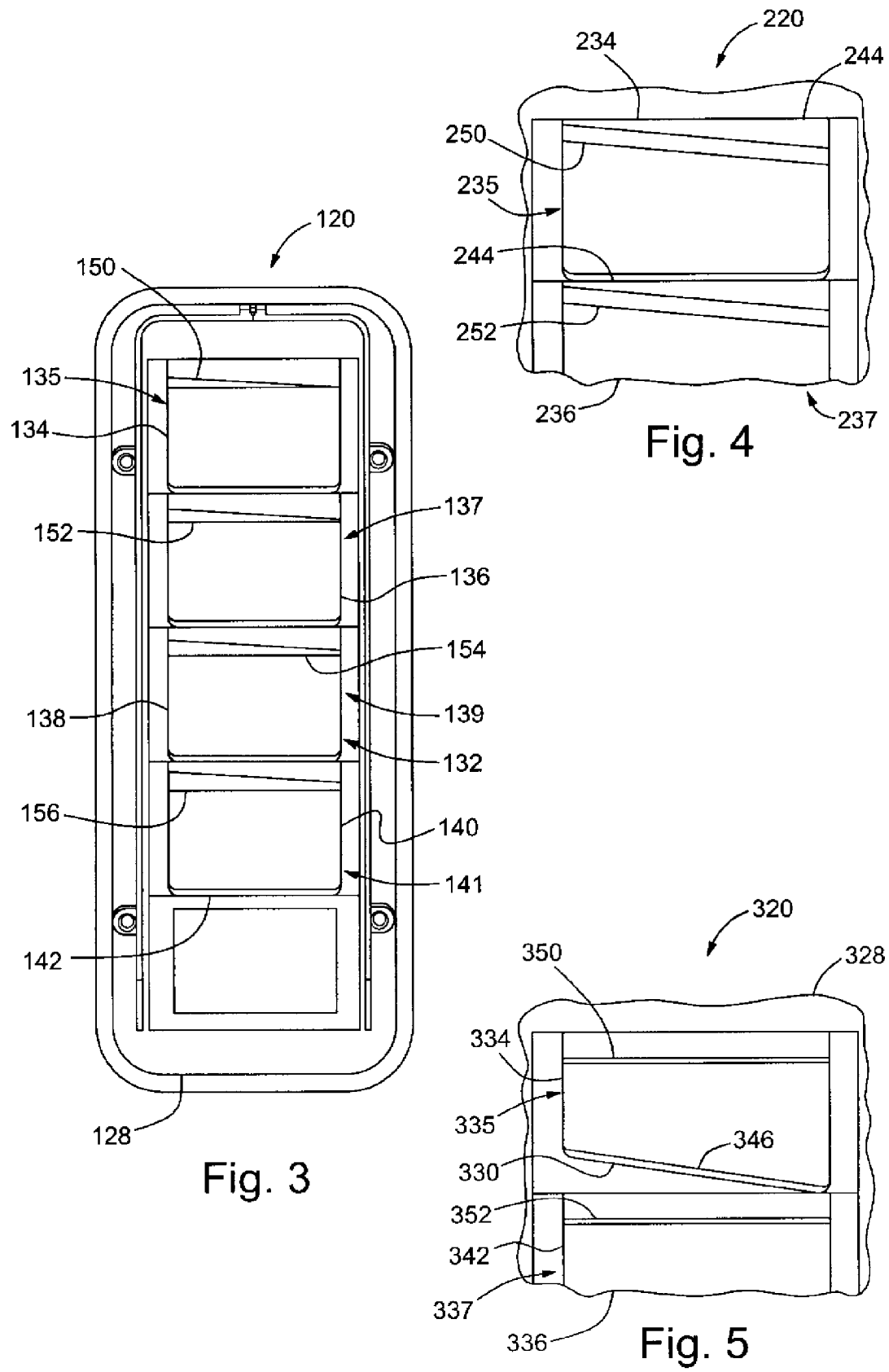

ASYMMETRICAL PRESSURE RELIEF VENT

BACKGROUND OF THE INVENTION

The present application relates generally to a pressure relief vent assembly for use in relieving air pressure in a vehicle.

Modern automotive vehicles typically include pressure relief vents, mounted somewhere on the body of the vehicle, to selectively allow for air flow out of the passenger compartment of the vehicle while limiting airflow in the opposite direction. The air flow occurs when the air pressure in the vehicle is greater than the atmospheric pressure outside the vehicle by a predetermined amount. For example, the pressure inside the vehicle may rise temporarily when a vehicle door is closed. The pressure relief vents open during these events, thus avoiding air pressure levels that would be uncomfortable for the vehicle occupants.

The typical body pressure relief vents used on automotive vehicles have uniform and symmetrical flaps and hinges, so they generally open and close simultaneously for given pressure differentials between the vehicle passenger compartment and atmospheric pressure. While adequately relieving the pressure, an issue that sometimes arises with these vents is that the noise generated when all of the flaps slap shut (i.e., impact against a frame of a valve housing) at the same time irritates some vehicle occupants. This may occur, for example, during the vehicle door closing event. The combined noise from all of the flaps may be more easily heard in certain types of vehicles, such as pickup trucks where the pressure relief valve may be located on the back of the cab, allowing this undesirable slapping noise to be more easily heard by the occupants.

Since there are some occupants who find this noise objectionable, solutions have been proposed that attempt to solve this concern. For example, hot glue dollops have been applied to each flap along its hinge. But this limits the flow rate of air out through the valves more than is desirable and adds more cost to the pressure relief valve assembly than is desired. In another example, nibs have been added to each flap or the frame around the flaps where the two contact. But this allows an increase in backflow through the valves that may be higher than is desirable. Thus, a cost effective way to reduce or eliminate this noise, while still allowing for the body pressure relief function to be performed adequately, is desired.

SUMMARY OF THE INVENTION

An embodiment contemplates a valve for use in a pressure relief vent assembly for a vehicle. The valve may include a valve housing having a frame defining a vent opening; and a flap having a periphery extending around and covering the vent opening, with the periphery including a hinge edge affixed to the frame. The flap includes a hinge adjacent to the hinge edge that is bendable when a pressure in the vehicle is greater than a pressure outside of the vehicle, and an asymmetric closing characteristic, wherein the asymmetric closing characteristic induces a twisting in the flap when the flap opens and closes.

An embodiment contemplates a pressure relief vent assembly for a vehicle. The pressure relief vent assembly may include a valve housing having a frame defining a first vent opening and a second vent opening. A first flap has a first periphery extending around and covering the first vent opening, with the first periphery including a first hinge edge affixed to the frame, the first flap including a first hinge adjacent to the first hinge edge that is bendable when a pressure differential is greater than a first pressure difference between a pressure in the vehicle and a pressure outside of the vehicle defining a first pressure inducing closing characteristic. A second flap has a second periphery extending around and covering the second vent opening, with the second periphery including a second hinge edge affixed to the frame, the second flap including a second hinge adjacent to the second hinge edge that is bendable when the pressure differential is greater than a second pressure difference between the pressure in the vehicle and the pressure outside of the vehicle defining a second pressure inducing closing characteristic, with the second pressure inducing closing characteristic being different than the first pressure inducing closing characteristic.

An embodiment contemplates a method for relieving a pressure from inside of a vehicle through a pressure relief vent assembly, the method comprising the steps of: providing a valve, having a frame defining a vent opening covered by a flap having a hinge, to selectively allow for a flow of air from the inside of the vehicle to outside of the vehicle through the vent opening; bending the flap about the hinge to open the vent when the pressure inside the vehicle is greater than a pressure outside of the vehicle by a predetermined amount; and inducing a twisting in the flap as the flap is bent about the hinge such that a periphery of the flap will contact the frame around the vent opening sequentially upon closing.

An advantage of an embodiment is a reduction in the peak noise level created by the flaps when the valves are closing. This is accomplished with minimal cost, without limiting the air flow through the valves to an undesirably low level, and without increasing the backflow of air through the valves to an undesirable level.

BRIEF DESCRIPTION OF THE DRAWINGS

FIG. 1 is a perspective view of a pressure relief vent assembly according to a first embodiment.

FIG. 2 is a front view of the assembly of FIG. 1.

FIG. 3 is a view similar to FIG. 2, but illustrating a second embodiment.

FIG. 4 is a front view of a portion of a pressure relief vent assembly according to a third embodiment.

FIG. 5 is a view similar to FIG. 4, but illustrating a fourth embodiment.

DETAILED DESCRIPTION

Figure 6:
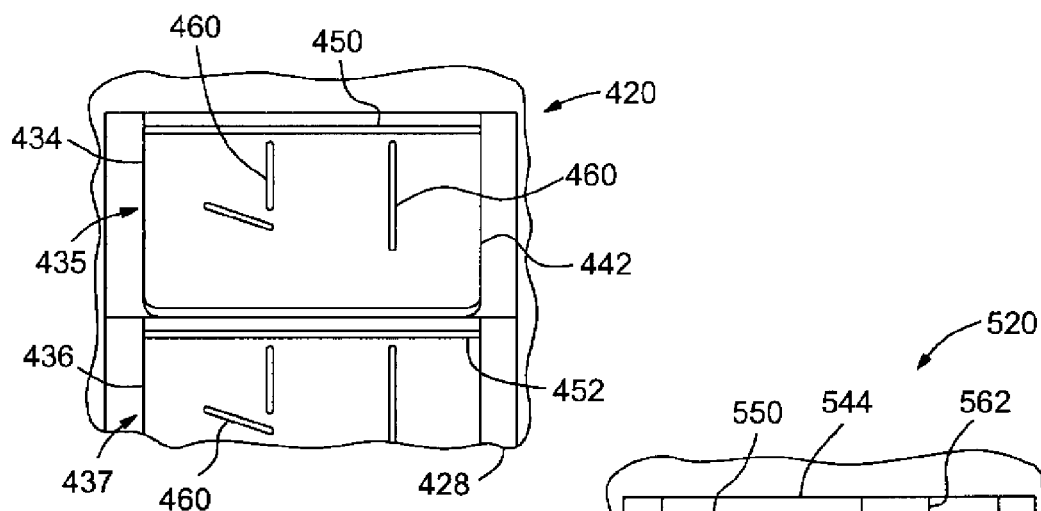
FIG. 6 is a view similar to FIG. 4, but illustrating a fifth embodiment.

FIGS. 1-2 illustrate a pressure relief vent assembly 20 that mounts and seals to an opening 22 in vehicle structure 24. The assembly 20 includes a valve housing 26, which has a frame 28. The frame 28 includes four vent openings 30 that allow for air flow from an interior portion (not shown) of a vehicle, such as a passenger compartment, to outside of the vehicle.

A set of flaps 32 includes a top flap 34, an upper middle flap 36, a lower middle flap 38, and a bottom flap 40. Each flap in the set of flaps 32 has a periphery 42, which includes a hinge edge 44, an opposed edge 46 that is opposite to the hinge edge 44, and a pair of side edges 48 that extend between the hinge edge 44 and the opposed edge 46. The periphery 42 of each flap in the set of flaps 32 contacts with and generally seals around a respective one of the vent openings 30. Each flap in the set of flaps 32 is secured-over a respective one of the vent openings 30 in the frame 28—along its hinge edge 44. Each flap 34, 36, 38, 40 and the portion of the frame 28 defining its corresponding vent opening form a valve 35, 37, 39, 41. While a vent assembly 20 with four valves is shown herein, of course other numbers of valves can be used for a particular vent assembly, as desired.

The top flap 34 includes a first hinge 50, the upper middle flap 36 includes a second hinge 52, the lower middle flap 38 includes a third hinge 54, and the bottom flap 40 includes a fourth hinge 56. Each of the hinges 50, 52, 54, 56 extends adjacent and generally parallel to its respective hinge edge 44. Each hinge 50, 52, 54, 56, is bendable to allow its corresponding flap 34, 36, 38, 40 to pivot outward away from the corresponding opening 30 in one direction only—namely, in a direction that allows excess pressure in the passenger compartment to be relieved to atmosphere outside of the vehicle. When the pressures are essentially equal or the higher pressure acts in the opposite direction, the set of flaps 32 remain closed against the frame 28, greatly limiting or preventing air flow into the vehicle from the atmosphere. The hinges 50, 52, 54, 56 are preferably living hinges (i.e., a thin or soft spot in the material that can repeatedly bend elastically and has a long fatigue life). Alternatively, the hinges may be a mechanical type of hinge connecting each flap to the housing or connecting two portions of each flap together.

Each of the hinges 50, 52, 54, 56 has a varying width—that is, it is wider at a first end at one side edge 48 than at a second end at the opposite side edge 48, with a taper in between. This width variation of the hinges 50, 52, 54, 56 creates an asymmetrical closing characteristic, in this case an asymmetrical hinge spring rate. The asymmetrical hinge spring rate means that the hinge spring rate is not constant and uninterrupted from one side edge 48 to the other side edge 48. That is, when the difference between the pressure in the vehicle relative to atmospheric pressure outside of the vehicle is significant, the flaps will open to allow air to flow out of the passenger compartment. The asymmetrical hinge spring rate, though, will induce a twist in each flap 34, 36, 38, 40 as it opens. When the pressure difference is reduced or eliminated, the flaps will return to their closed positions. As they return to their closed positions, the twisting effect causes the periphery 42 of each flap 34, 36, 38, 40 to contact the frame 28 sequentially rather than simultaneously. This sequential contact may reduce the peak noise generated during flap closing as compared to conventional flaps. And, even though there is twisting induced in the flaps 34, 36, 38, 40 while open, they all seal against the frame 28 when closed. The average width and amount of taper for the hinges 50, 52, 54, 56 can vary based upon the particular vehicle application.

FIG. 3 illustrates a second embodiment of a pressure relief vent assembly 120. The embodiment shown in FIG. 3 has many items in common with the first embodiment and to avoid unnecessary repetition of the description, the same reference numerals have been used but falling within the 100-series. The significant difference with this embodiment resides in the fact that, not only do the hinges 150, 152, 154, 156 taper, but they also vary from one flap 134, 136, 138, 140 to the next. That is, the first hinge 150 may have the same width as the hinges in the first embodiment, while the second hinge 152 on average is slightly wider than the first hinge 150, the third hinge 154 on average is slightly wider than the second hinge 152, and the fourth hinge 156 on average is slightly wider than the third hinge 154. Thus, each hinge will have a hinge spring rate that is different from the other hinges.

Accordingly, each hinge 150, 152, 154, 156, and thus each valve 135, 137, 139, 141, has a differing pressure inducing closing characteristic—they open and close at somewhat different pressure differentials. Consequently, in addition to each flap having its own asymmetrical closing characteristic, the flaps 134, 136, 138, 140 have non-uniform closing characteristics (differing pressure inducing closing characteristic) between them. This may further reduce the peak noise level as compared to the first embodiment in that not only do the flaps 134, 136, 138, and 140 contact the frame 128 sequentially around their peripheries 142 during closing, but the flap-to-flap variation will cause each flap, during closing, to contact the frame 128 at a slightly different time than each of the other flaps. While the second embodiment shows this flap-to-flap variation, the other embodiments disclosed herein may also include a flap-to-flap variation as well.

FIG. 4 illustrates a third embodiment of a pressure relief vent assembly 220. The embodiment shown in FIG. 4 has many items in common with the first embodiment and to avoid unnecessary repetition of the description, the same reference numerals have been used but falling within the 200-series. The significant difference with this embodiment resides in the fact that, the hinges 250, 252 (only first and second flaps shown) are now angled (non-parallel) relative to the hinge edge 244 of the flaps 234, 236. The angled hinges 250, 252 create the asymmetrical closing characteristic for these valves 235, 237. The width of the hinges 250, 252 may be constant as shown in FIG. 4, or, if so desired, may include a taper similar to that shown in the first two embodiments to increase the asymmetrical closing characteristic.

FIG. 5 illustrates a fourth embodiment of a pressure relief vent assembly 320. The embodiment shown in FIG. 5 has many items in common with the first embodiment and to avoid unnecessary repetition of the description, the same reference numerals have been used but falling within the 300-series. The significant difference with this embodiment resides in the fact that the asymmetrical closing characteristic for these valves 335, 337 is created by an angled opposed edge 346 rather than by asymmetry built into the hinges 350, 352. The opposed edge 346, and its corresponding opening 330 in the frame 328, are angled (i.e., non-parallel) relative to the hinge edge 344 for each flap 334, 336 (again only two flaps shown). As with the previous embodiments, the asymmetry in each flap 334, 336 causes a twisting during opening and closing of the valves 335, 337, thus causing the periphery 342 of each flap to contact the frame 328 sequentially rather than all at one time. Of course, one may, if so desired, provide asymmetry in the hinges as well.

FIG. 6 illustrates a fifth embodiment of a pressure relief vent assembly 420. The embodiment shown in FIG. 6 has many items in common with the first embodiment and to avoid unnecessary repetition of the description, the same reference numerals have been used but falling within the 400-series. The significant difference with this embodiment resides in the fact that the asymmetrical closing characteristic for these valves 435, 437 is created by asymmetrical ribbing 460 protruding from or recessed into the flaps 434, 436 (again only two shown) rather than by asymmetry built into the hinges 450, 452. The asymmetry caused by the ribbing 460 causes the twisting leading to the periphery 442 of each flap contacting the frame 428 sequentially. Of course, one may, if so desired, provide asymmetry in the hinges as well.

Figure 7:
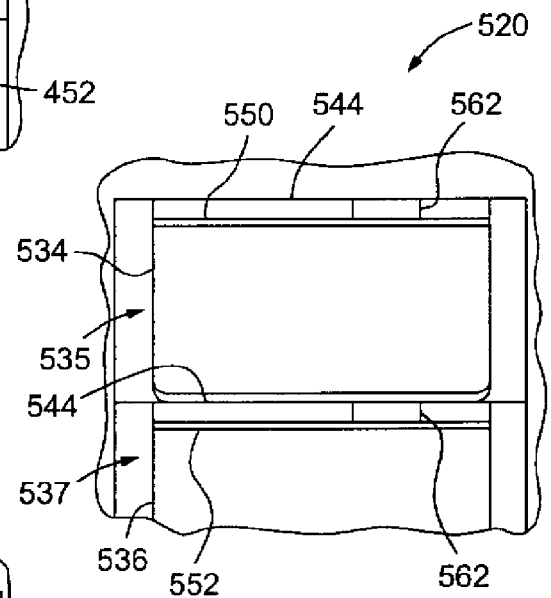
FIG. 7 is a view similar to FIG. 4, but illustrating a sixth embodiment.

FIG. 7 illustrates a sixth embodiment of a pressure relief vent assembly 520. The embodiment shown in FIG. 7 has many items in common with the first embodiment and to avoid unnecessary repetition of the description, the same reference numerals have been used but falling within the 500-series. The significant difference with this embodiment resides in the fact that the asymmetrical closing characteristic for these valves 535, 537 is created by asymmetrical step cutout features 562 in the flaps 534, 536 (only two shown) located between the hinges 550, 552 and their respective hinge edges 544. Again, the asymmetry induces the twisting in the flaps 534, 536. Other types of asymmetry in the flaps disclosed herein may be included in the flaps 534, 536 of this embodiment as well, if so desired.

Figure 8:
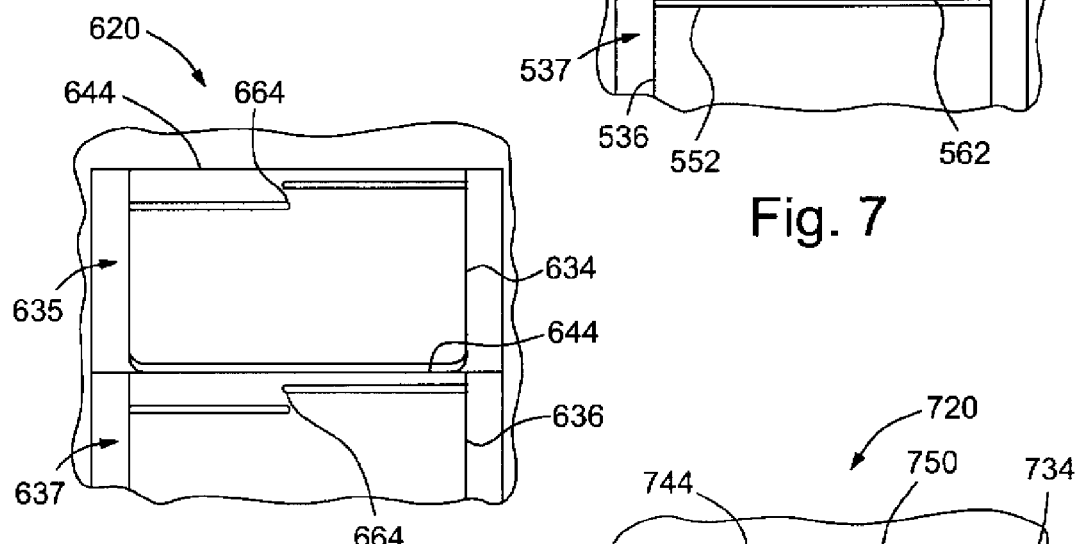
FIG. 8 is a view similar to FIG. 4, but illustrating a seventh embodiment.

FIG. 8 illustrates a seventh embodiment of a pressure relief vent assembly 620. The embodiment shown in FIG. 8 has many items in common with the first embodiment and to avoid unnecessary repetition of the description, the same reference numerals have been used but falling within the 600-series. The significant difference with this embodiment resides in the fact that the asymmetrical closing characteristic for these valves 635, 637 is created by asymmetrical hinge step features 664 in the flaps 634, 636 (only two shown). The hinge step features 664 are created by having one portion of the hinge closer to the hinge edge 644 than another portion. Other types of asymmetry in the flaps disclosed herein may be included in the flaps 634, 636 of this embodiment as well, if so desired.

Figure 9:
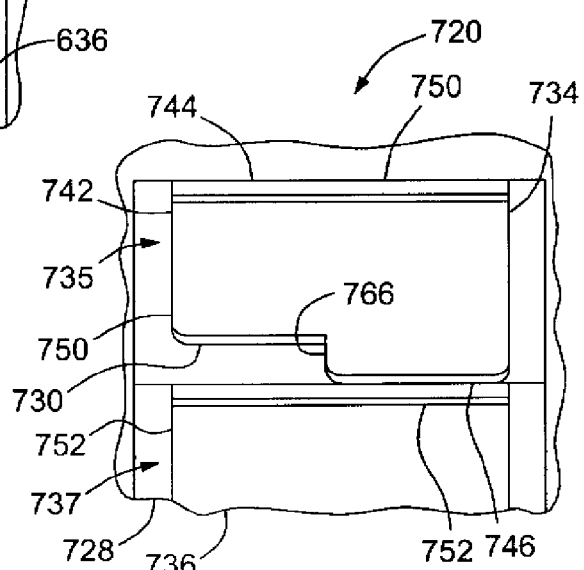
FIG. 9 is a view similar to FIG. 4, but illustrating an eighth embodiment.

FIG. 9 illustrates an eighth embodiment of a pressure relief vent assembly 720. The embodiment shown in FIG. 9 has many items in common with the first embodiment and to avoid unnecessary repetition of the description, the same reference numerals have been used but falling within the 700-series. The significant difference with this embodiment resides in the fact that the asymmetrical closing characteristic for these valves 735, 737 (only two shown) is created by step jogs 766 in opposed edges 746 rather than by asymmetry built into the hinges 750, 752. Each opposed edge 746, and its corresponding opening 730 in the frame 728, includes the step jog 766 so that one portion of the opposed edge 746 is closer to the hinge edge 744 than another portion of the opposed edge 746. As with the previous embodiments, the asymmetry in each flap 734, 736 induces a twisting during opening and closing of the valves 735, 737, thus causing the periphery 742 of each flap to contact the frame 728 sequentially rather than all at one time. Of course, one may, if so desired, provide an asymmetry in the hinges 750, 752 as well.

Various alternatives to the embodiments disclosed above are also contemplated. For example, the third through eighth embodiments may include variation between the respective flaps in a vent assembly to create a differing pressure inducing closing characteristic as discussed relative to the second embodiment. In addition, the variation between the respective flaps may include employing flaps from different embodiments discussed above in the same vent assembly.

While certain embodiments of the present invention have been described in detail, those familiar with the art to which this invention relates will recognize various alternative designs and embodiments for practicing the invention as defined by the following claims.

What is claimed is:

1. A valve for use in a pressure relief vent assembly for a vehicle, the valve comprising:
   a valve housing having a frame defining a vent opening;
   a flap having a periphery extending around and covering the vent opening, with the periphery including a first side edge, a second side edge spaced from the first side edge, and a hinge edge extending from the first side edge to the second side edge and affixed to the frame, the flap including a hinge adjacent to the hinge edge that is bendable when a pressure in the vehicle is greater than a pressure outside of the vehicle, and an asymmetric closing characteristic, wherein the asymmetric closing characteristic induces a twisting in the flap when the flap opens and closes; and
   wherein the asymmetric closing characteristic is defined by the hinge having a width, the width of the hinge being in a direction generally parallel to the first and second side edges, and the width tapering from a first end of the hinge adjacent to the first side edge to a second end of the hinge adjacent to the second side edge, and wherein the first side edge is parallel to the second side edge along the entire width of the hinge.

2. A pressure relief vent assembly for a vehicle comprising:
   a valve housing having a frame defining a first vent opening and a second vent opening;
   a first flap having a first periphery extending around and covering the first vent opening, with the first periphery including a first side edge, a second side edge spaced from the first side edge, and a first hinge edge extending from the first side edge to the second side edge and affixed to the frame, the first flap including a first hinge adjacent to the first hinge edge that is bendable when a pressure differential is greater than a first pressure difference between a pressure in the vehicle and a pressure outside of the vehicle defining a first pressure inducing closing characteristic, and wherein the first hinge has a width, the width of the first hinge being in a direction generally parallel to the first and second side edges, and the width tapering from a first end of the first hinge adjacent to the first side edge to a second end of the first hinge adjacent to the second side edge, and wherein the first side edge is parallel to the second side edge along the entire width of the hinge; and
   a second flap having a second periphery extending around and covering the second vent opening, with the second periphery including a second hinge edge affixed to the frame, the second flap including a second hinge adjacent to the second hinge edge that is bendable when the pressure differential is greater than a second pressure difference between the pressure in the vehicle and the pressure outside of the vehicle defining a second pressure inducing closing characteristic, with the second pressure inducing closing characteristic being different than the first pressure inducing closing characteristic.

3. The pressure relief vent assembly of claim 2 wherein the second flap has an asymmetrical closing characteristic, and wherein the asymmetric closing characteristic induces a twisting in the second flap when the second flap opens and closes.

4. The pressure relief vent assembly of claim 2 wherein the second periphery includes a third side edge, a fourth side edge spaced from the third side edge, and the second hinge edge, the second hinge edge extending from the first side edge to the second side edge, and wherein the second hinge has a width, the width of the second hinge being in a direction generally parallel to the third and fourth side edges, and the width tapering from a first end of the second hinge adjacent to the third side edge to a second end of the second hinge adjacent to the fourth side edge.

5. A method for relieving a pressure from inside of a vehicle through a pressure relief vent assembly, the method comprising the steps of:
   providing a valve, having a frame defining a vent opening covered by a flap having a periphery extending around and covering the vent opening, with the periphery including a first side edge, a second side edge spaced from the first side edge, and a hinge edge extending from the first side edge to the second side edge and affixed to the frame, the flap including a hinge adjacent to the hinge edge that is bendable when a pressure differential is greater than a pressure difference between a pressure in the vehicle and a pressure outside of the vehicle, and wherein the hinge has a width, the width of the hinge being in a direction generally parallel to the first and second side edges, and the width tapering from a first end of the hinge adjacent to the first side edge to a second end of the hinge adjacent to the second side edge and the first side edge is parallel to the second side edge along the entire width of the hinge, to selectively allow for a flow of air from the inside of the vehicle to outside of the vehicle through the vent opening by flexing the hinge;

bending the flap about the hinge to open the vent when the pressure inside the vehicle is greater than a pressure outside of the vehicle by a predetermined amount of pressure; and inducing a twisting in the flap as the flap is bent about the hinge such that a periphery of the flap will contact the frame around the vent opening sequentially upon closing.

6. The method of claim 5 including the steps of:

providing a second valve, having a second vent opening defined by the frame and covered by a second flap having a second hinge;

bending the second flap about the second hinge to open the second vent when the pressure inside the vehicle is greater than the pressure outside of the vehicle by a second predetermined amount of pressure; and inducing a twisting in the second flap as the second flap is bent about the second hinge such that a periphery of the second flap with contact the frame around the second vent opening sequentially upon closing.

7. The method of claim 6 wherein the first predetermined amount of pressure is different from the second predetermined amount of pressure.

8. The method of claim 6 wherein the step of inducing a twisting in the second flap is further defined by providing the second hinge with an asymmetrical hinge spring rate.

* * * * *